United States Patent Office 3,371,013

Patented Feb. 27, 1968

3,371,013

METHODS OF EFFECTING ANTIDEPRESSANT THERAPY

David Jack and Norman James Harper, London, England, assignors to Allen & Hanburys Limited, London, England No Drawing. Filed Nov. 19, 1964, Ser. No. 412,299
Claims priority, application Great Britain, Nov. 20, 1963, 47,113/63
3 Claims. (Cl. 167—65)

This invention relates to pharmaceutical compositions and more particularly to pharmaceutical compositions having pharmacological effects upon the central nervous system.

It has been found according to this invention that 1-methyl-4-phenyl-4-piperidinol and its non-toxic acid addition salts possess desirable pharmacological properties and in particular are capable of use in the treatment of psychotic and psychoneurotic diseases. 1-methyl-4-phenyl-4-piperidinol has the formula:

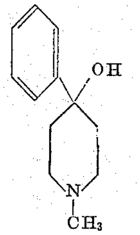

The present invention provides a pharmaceutical composition, valuable in the treatment of psychotic and psychoneurotic diseases comprising 1-methyl-4-phenyl-4-piperidinol, or a non-toxic acid addition salt thereof and a pharmaceutically acceptable carrier.

It is known that the depressant effects of Reserpine can be prevented or delayed by prior administration of antidepressant drugs and antagonism of Reserpine-induced depression in rats and mice can be used as a method of evaluating antidepressant drugs (Maxwell et al., Nature, 1961, 191, 84; Sulser et al., Ann. N.Y. Acad. Sci., 1962, 96, 279). We have found that 1-methyl-4-phenyl-4- piperidinol is between 3 and 5 times as effective as the known antidepressant drug imipramine in this test.

The anti-depressant activity of 1-methyl-4-phenyl-4-piperidinol is not amphetamine-like since no obvious hyperactivity was seen when the compound was administered to small animals at doses which prevent Reserpine-induced depression. Again, unlike amphetamine, but like imipramine, 1-methyl-4-phenyl-4-piperidinol did not reverse established Reserpine-induced depression.

The compound used in the present invention differs from imipramine in being devoid of anticholinergic activity and having very low anticonvulsant activity. For example, in the maximum electric shock seizure test in mice (Swinyard et al., J. Pharmacol., 1952, 106, No. 3, 319; Cashin et al., J. Pharm. Pharmacol. 1962, 14, 44T-47T) 1-methyl-4-phenyl-4- piperidinol was found to have an oral $ED_{50}$ of about 200 mg./kg. while imipramine had an oral $ED_{50}$ (with 95% fiducial limits) of 38.6 (26.4–56.4) mg./kg. The compound used in the present invention also differs from imipramine in its effect on the normal behaviour of animals. For example, when administered to mice at 200 mg./kg. 1-methyl-4-phenyl-4-piperidinol caused slight stimulation while at 400 mg./kg. the stimulation was more marked and was followed by depression. Imipramine, at doses of 100–200 mg./kg. caused marked central nervous system depression, no stimulant effects being observed.

The anti-depressant activity of 1-methyl-4-phenyl-4-piperidinol has been shown by recognised biochemical tests not to be due to the inhibition of monoamine oxidase.

Thus the compound used in the present invention possesses anti-depressant activity which is not amphetamine-like nor is it due to the inhibition of monoamine oxidase. In some respects the activity of 1-methyl-4-phenyl-4-piperidinol resembles the activity of the known anti-depressant drug imipramine while in other respects the activities of the two compounds differ.

Preferably the composition is in unit dosage form which expression as used herein means a physically discrete unit containing a predetermined dose of the active compound in association with a pharmaceutical carrier or a diluent.

The unit dosage form may comprise 5 to 500 mg. of the active ingredient. The daily dose of the composition may consist of one or more unit dosages and will be an amount sufficient to provide from 25 to 1000 mg. of the active constituent depending on the age, weight and condition of the animal and the route of administration.

The carrier or diluent may be a solid or a liquid. In the former instance the composition of the present invention may exist in the form of, for example, capsules, suppositories, cachets or tablets which may include binders and lubricants and which may be coated. If the carrier or diluent is a liquid the composition may be in unit dosage form, such as sterile solutions in ampoules for parenteral administration or solutions in soft gelatine capsules for oral administration or the composition may be, for example, a suspension or solution for oral administration in which the liquid carrier is associated with one or more wetting agents, suspending agents, flavouring agents, sweetening agents, colouring agents, or preserving agents.

Non-toxic acid addition salts of 1-methyl-4-phenyl-4-piperidinol with inorganic or organic acids, which may be used as active ingredients of the present invention, include, for example, salts derived from hydrogen chloride, hydrogen bromide, sulphuric acid, citric acid, tartaric acid, methane-sulphonic acid, succinic acid, maleic acid and benzoic acid.

The following examples illustrate the invention:

EXAMPLE 1

*Tablets.*—108.95 g. of lactose, B.P., 11.64 g. of starch B.P. and 2.91 g. of pregelatinised starch powder were blended and made into a coherent mass with distilled water. The mass was granulated by passing through a No. 14 B.S. mesh and the granules were then dried and passed through a No. 16 B.S. mesh sieve. The granules, 25.00 g. of 1-methyl-4-phenyl-4-piperidinol hydrochloride and 1.50 g. of magnesium stearate B.P. were blended together in a cube mixer and the mixture was then compressed in a conventional tablet machine to give tablets each containing 25 mg. of the active ingredient.

In the above tablet the amount of active ingredient can be varied widely. For example, tablets containing 100 mg. of active ingredient were prepared from 100.00 g. of 1-methyl-4-phenyl-4-piperidinol hydrochloride, 33.95 g. of lactose B.P., 11.64 g. of starch B.P., 2.910 g. of pregelatinised starch powder and 1.50 g. of magnesium stearate.

EXAMPLE 2

*Capsules.*—1-methyl - 4-phenyl - 4-piperidinol, 10 g.; lactose, 90 g.

The above ingredients were thoroughly mixed and charged into No. 4 hard gelatine capsules each containing 10 mg. of the active substance.

EXAMPLE 3

*Syrups.*—1-methyl-4-phenyl - 4-piperidinol hydrochloride, 0.2 g.; syrup vehicle to 100 ml.

A syrup suitable for oral administration was obtained by dissolving the active ingredient in the syrup vehicle. The syrup vehicle contained 70% w./v. sucrose in water with suitable sweetening, flavouring and colouring agents and was preserved with 0.05% w./v. of methyl parahydroxybenzoate.

EXAMPLE 4

*Injection solutions.*—A 0.25% w./v. solution suitable for parenteral administration was prepared by dissolving 2.5 g. of 1-methyl-4-phenyl-4-piperidinol hydrochloride in 1 litre of water for injection by stirring. The solution so obtained was sterilised by passage through a previously sterilised bacteria retaining filter and was aseptically filled, into previously sterilised 2 ml. ampoules. A suitable bacteriostat and a salt to render the solution isotonic may also be included.

Solutions of other suitable strengths were similarly prepared.

What is claimed is:

1. A method of effecting antidepressant therapy in an animal having a depressed central nervous system which comprises administering orally or parenterally to such animal an antidepressant amount of a compound selected from the group consisting of 1-methyl-4-phenyl-4-piperidinol and its non-toxic acid addition salts in a pharmaceutically acceptable carrier.

2. A method according to claim 1 in which the animal is given an amount of the selected compound in unit dosage form ranging from 5 to 500 milligrams.

3. A method according to claim 1 in which the animal is given an amount of the selected compound in unit dosage form ranging from 5 to 500 milligrams up to a total daily dose of 25 to 1000 milligrams.

References Cited

Chem. Abstracts 52 (1958), p. 16374d.

ALBERT T. MEYERS, *Primary Examiner.*

JULIAN S. LEVITT, *Examiner.*

S. FRIEDMAN, *Assistant Examiner.*

UNITED STATES PATENT OFFICE

CERTIFICATE OF CORRECTION

Patent No. 3,371,013 February 27, 1968

David Jack et al.

It is hereby certified that error appears in the above numbered patent requiring correction and that the said Letters Patent should read as corrected below.

In the heading to the printed specification, line 8, for "Nov. 20, 1963," read -- Nov. 28, 1963, --.

Signed and sealed this 10th day of June 1969.

(SEAL)
Attest:

Edward M. Fletcher, Jr.
Attesting Officer

WILLIAM E. SCHUYLER, JR.
Commissioner of Patents